US011007771B2

(12) United States Patent
Xiang et al.

(10) Patent No.: US 11,007,771 B2
(45) Date of Patent: May 18, 2021

(54) DIGITAL INK-SUPPLYING METHOD FOR PRINTING PRESS

(71) Applicant: LONGWOOD INFORMATION TECHNOLOGY LIMITED, Zhejiang (CN)

(72) Inventors: Jianlong Xiang, Hangzhou (CN); Bo Gao, Hangzhou (CN)

(73) Assignee: HANGZHOU CRON MACHINERY & ELECTRONICS CO., LTD., Hangzhou (CN)

(*) Notice: Subject to any disclaimer, the term of this patent is extended or adjusted under 35 U.S.C. 154(b) by 321 days.

(21) Appl. No.: 16/085,426

(22) PCT Filed: Jan. 22, 2017

(86) PCT No.: PCT/CN2017/072007
§ 371 (c)(1),
(2) Date: Sep. 14, 2018

(87) PCT Pub. No.: WO2017/157106
PCT Pub. Date: Sep. 21, 2017

(65) Prior Publication Data
US 2019/0084294 A1 Mar. 21, 2019

(30) Foreign Application Priority Data

Mar. 17, 2016 (CN) .......................... 201610156149.8
Mar. 17, 2016 (CN) .......................... 201610156192.4

(51) Int. Cl.
*B41F 33/00* (2006.01)
*G01J 3/52* (2006.01)
(Continued)

(52) U.S. Cl.
CPC .......... *B41F 33/0045* (2013.01); *B41F 31/02* (2013.01); *B41M 5/0023* (2013.01);
(Continued)

(58) Field of Classification Search
CPC ... B41F 31/02; B41F 33/0045; B41M 5/0023; G01J 3/52; G01J 3/463; G01J 3/513
See application file for complete search history.

(56) References Cited

U.S. PATENT DOCUMENTS

| 2004/0000241 A1* | 1/2004 | Kiyohara | ................ B41F 33/00 101/135 |
| 2004/0107852 A1* | 6/2004 | Tafel | ...................... B41F 31/08 101/350.1 |

FOREIGN PATENT DOCUMENTS

| JP | 07-241980 | * | 3/1994 | .............. B41F 31/02 |
| JP | 2009-107188 | * | 10/2007 | ............ B41F 33/063 |

* cited by examiner

*Primary Examiner* — Matthew G Marini
*Assistant Examiner* — Marissa Ferguson-Samreth
(74) *Attorney, Agent, or Firm* — Jiwen Chen; Jacobson Holman PLLC

(57) ABSTRACT

The present invention discloses an accurate digital ink supply method for a printing press. The present invention adopts metering-type ink delivery units to replace the ink keys of the traditional printing press, and the metering-type ink delivery units directly deliver the ink to the corresponding ink zones on the metering basis of either volume or mass, realizing the quantitative supply of ink to each one of the ink zones. The present invention can perform accurate adjustment in real time, is high in automation and digitalization degree and large in adjustable range, realizes one-way ink delivery and avoids ink return.

6 Claims, 2 Drawing Sheets

(51) Int. Cl.
   *B41F 31/02* (2006.01)
   *B41M 5/00* (2006.01)
   *G01J 3/46* (2006.01)
   *G01J 3/51* (2006.01)
(52) U.S. Cl.
   CPC ............... *G01J 3/463* (2013.01); *G01J 3/513* (2013.01); *G01J 3/52* (2013.01)

DIGITAL INK-SUPPLYING METHOD FOR PRINTING PRESS

This is a U.S. national stage application of PCT Application No. PCT/CN2017/072007 under 35 U.S.C. 371, filed Jan. 22, 2017 in Chinese, claiming priority of Chinese Application No. 201610156149.8, filed Mar. 17, 2016 and Chinese Application No. 201610156192.4, filed Mar. 17, 2016, all of which are hereby incorporated by reference.

BACKGROUND OF THE INVENTION

1. Technical Field

The present invention belongs to the technical field of printing technology, printing processes, mechanical and electronic control, and digital computing technologies, and specifically relates to an accurate digital ink supply method for a printing press.

2. Description of Related Art

A printing press is mainly constituted by an ink supply system, an ink distributing mechanism and a printing mechanism. At present, the ink supply system of an ink printing press employs an ink duct which is equipped with mechanical ink keys as an ink supply device of a single color cell of the printing press. The ink duct may control the ink keys electrically (motor-driving) or manually (screw-driving, etc.). Usually, an image-text to be printed forms four or more colors through color separation, and color plates are respectively manufactured and then printed in a superimposed way on a printing press to generate a colorful print. Each one of the color cells of the printing press completes the printing work of a single color. The printing format of each one of the color cells is equally divided into a plurality of ink zones; each one of the color cells is equipped with an ink duct; each one of the ink ducts includes a plurality of ink keys, and each one of the ink keys corresponds to an ink zone. The ink supply to each one of the ink zones can be controlled and regulated by adjusting the opening degree of each corresponding one of the ink keys. During actual printing production, the printed colors are controlled by setting the degrees of the opening of the corresponding ink keys according to the dot area of each one of the dot zones of each one of the single color cells. For an ink zone with a large consumption of ink, the opening of the corresponding ink key needs to be enlarged. On the contrary, for an ink zone with a small consumption of ink, the opening of the corresponding ink key of the ink zone needs to be reduced, and even completely closed. The critical opening and closing points of ink keys are called zero points. The maximum opening of the ink key from zero is defined as an opening value. Different printing press manufacturers set their own respective opening value ranges. The ink keys are not metering-type control units, and the opening values thereof are relative reference values provided by all printing press systems.

The ink keys are mechanical products, and the actual regulation range of the openings is very small (usually within the range of 0-0.2 mm), thus causing relatively significant difficulties in the calculation of the zero position and the accurate control of the opening degree. The ink keys of one ink duct are low in consistency. They fail to ensure the absolute accuracy and relative accuracy. Besides the ink duct and the ink key, other mechanical contact and mechanical touch methods are also adopted in the ink supply mode and mechanisms of the traditional printing press to deliver the ink, specifically referring to the ink delivery rollers which work in a swinging way, the rotating speed of the ink rollers, the time of contact between the ink rollers and the control accuracy of the actions. The mechanisms and the working principles make the calculation, regulation and control of the actual ink supply more difficult and result in failure of accurate quantization. To solve the above-mentioned problems, various technologies are adopted in the printing process. Specifically, in some cases, an ink release curve of each one of the ink ducts is set to approach the correspondence relationship between the ink supply and the opening value, but it fails to essentially realize the accurate control over the ink supply.

For those reasons, the ink supply system of the traditional printing press works with a "simulated amount" and a qualitative method. Whether the ink supply is "excessive" or "insufficient" can only be judged through detecting the print, and the actual ink supply is unknown. The setup and regulation of the ink supply are based on experience and tests, so the efficiency is low.

BRIEF SUMMARY OF THE INVENTION

Aiming at the above-mentioned problems of the current ink supply system which employs mechanical ink keys to control the ink supply, the object of the present invention is to provide an accurate digital ink supply method for a printing press on the basis of accurate calculation on actual ink demands.

To solve the above-mentioned problems, the present invention adopts the following technical solution.

A digital ink supply method for a printing press comprises calculating an ink demand according to a color plate, and outputting the ink demanded for printing by a metering-type ink delivery device.

The calculation of the ink demand is based on either volume or mass.

The method of the present invention may apply to single-color printing, or multi-color superimposed printing. During multi-color printing, all color cells are supplied with ink by using the ink supply method of the present invention. When the method is applied to a narrow-format printing press with an undivided ink zone (there is only one ink zone in the whole printing format), the ink demand in a unit of time can be specifically calculated according to the ink demand of and printing speed (number of printed sheets in a unit of time) of a single printing of a printing plate, and the metering-type ink supply device outputs ink by taking the ink demand in a unit of time as the output flow. In the present invention, the ink demand of a single printing of the printing plate is calculated and obtained through multiplying the dot area of the printing plate by a required ink layer thickness.

Further, for prints with a common format, considering the difference in transverse ink demands of the printed sheet, a printing format can be divided into a plurality of ink zones; a metering-type ink delivery device is provided in each one of the ink zones; the ink demand in a unit of time of each one of the ink zones is calculated according to the ink demand and printing speed of a single printing in each one of the ink zones of the printing plate, and each one of the metering-type ink delivery devices outputs ink by taking the ink demand in a unit of time in the corresponding ink zone as the output flow. In the present invention, the ink demand of a single printing of each one of the ink zones is calculated and obtained through multiplying the dot area of each one of the ink zones corresponding to the printing plate by a required ink layer thickness.

Further, the above-mentioned dot area is calculated and obtained according to an image data file for manufacturing the printing plate.

Further, the metering-type ink delivery devices control the output flow rate of the ink by controlling the running speeds of moving parts.

Further, each one of the metering-type ink delivery devices is selected from any one of the plunger pump, injection pump, peristaltic pump, gear pump and screw pump, with a metering or measurement function.

Preferably, each one of the metering-type ink delivery devices is a plunger pump or an injection pump, and each one of the metering-type ink delivery devices controls the running speed of a piston to control the output flow of the ink, and calculates the ink output according to the cross section of a piston cavity and a moving distance of the piston.

According to the ink supply method of the present invention, a process management module and a control module may realize ink supply; the process management module calculates and obtains the ink demand of single printing of each one of the ink zones of the printing plate according to image data, and transmits the obtained ink demand to the control module; the control module acquires the running state of the printing press through a signal acquisition module; the control module respectively sets an ink flow rate for each one of the metering-type ink delivery devices and makes regulations in real time according to the running speed of the printing press; and during printing, the control module drives all metering-type ink delivery devices to deliver ink to their corresponding ink zones according to their respective set flow rates.

When the method of the present invention is adopted to supply ink, the ink in the metering-type ink delivery device is delivered in an enclosed delivery environment. The ink is under positive pressure in the enclosed delivery environment.

Based on the above digital ink supply method, the present invention further provides a printing method; according to the printing method, at least one color cell is used to print a pattern, characterized in that each one of the color cells includes at least one ink zone, a metering-type ink delivery device is provided in each one of the ink zones corresponding to each one of the color cells. The printing process comprises calculating an ink demand in a unit of time of each one of the ink zones of each one of the color cells; and, setting the ink output flow of each one of the metering-type ink delivery devices as the ink demand in a unit of time of the corresponding ink zone of the corresponding color cell.

Further, the ink demand in a unit of time of one ink zone in one color cell is the multiplying product of the printing speed which is represented by the number of sheets printed in a unit of time, the dot area of the ink zone corresponding to the printing plate of the color cell, and the ink layer thickness to be printed. The dot area is calculated and obtained according to an image data file for manufacturing the printing plate.

Further, the metering-type ink delivery devices control the output flow rate of the ink by controlling the running speeds of moving parts.

Further, each one of the metering-type ink delivery devices is selected from any one of the plunger pump, injection pump, peristaltic pump, gear pump and screw pump, with a metering function.

Further, each one of the metering-type ink delivery devices is a plunger pump or an injection pump, and each one of the metering-type ink delivery devices controls the running speed of a piston to control the output flow of the ink, and calculates the ink output according to the cross section of a piston cavity and a moving distance of the piston.

Similarly, in the printing method, a process management module and a control module may realize ink supply; the process management module calculates and obtains the ink demand of a single printing of each one of the ink zones of each one of the color plates according to the image data, and transmits the obtained ink demand to the control module; the control module acquires the running state of the printing press through a signal acquisition module; the control module respectively sets an ink flow rate for each one of the metering-type ink delivery devices and makes regulations in real time according to the running speed of the printing press; and during printing, the control module drives all metering-type ink delivery devices to deliver ink to their corresponding ink zones according to their respective set flow rates.

The present invention has the following beneficial effects: The method of the present invention realizes accurate quantitative control over the ink supply to the printing press, and by adopting the high-performance metering-type ink delivery device, the metering resolution may reach 0.2 ml (one cubic millimeter).

In addition, in the present invention, high-accuracy, metering-type ink delivery devices are arranged in a queue to form a digital ink duct which replaces the traditional ink duct; the ink delivery devices replacing the traditional ink keys supply ink to their respective ink zones. According to the actual printing action of the printing press, the ink required for printing a sheet is supplied each time a sheet is printed, and the metering is based on the ink volume or mass. In modern printing processes, the printing process has been digitalized, and the process management module can accurately calculate the theoretical ink amount according to the image-text information and the actual printing conditions (for example, printed sheet, ink variety, etc.) According to the printing press field data, (for example current printing speed, starting and stop of the actual printing production, etc.), the control module performs automatic control over each one of the ink delivery devices of each one of the color cells of the printing press, and accurately supplies ink in real time according to the actual ink demand of each corresponding one of the ink zones. For an ink supply with the method of the present invention, the actual supply is calculated and accurately controlled, and can be precisely adjusted in real time. The present invention is high in automation and digitalization degree and large in adjustable range, realizes one-way ink delivery, avoids ink return, and solves the shortcomings and defects of the traditional printing press well.

The accurate digital ink supply method realizes accurate ink preset and ink supply as well as complete digital calculation from the pre-printing pattern data to ink supply; the accurate digital ink supply method enhances the automation and intelligence level of the printing press and decreases the dependence on the personal skills and experience of the printing press operators; the accurate digital ink supply method enhances the overall performance of the printing press, enhances the print quality, maintains stable quality and ensures the consistency in quality of the sheet turning operation; the accurate digital ink supply method shortens the preparation time before the printing press starts to work and the commissioning time during operation switching, and reduces the waste of paper and ink caused by commissioning of the printing press; the ink is delivered in a one-way mode in a fully enclosed environment without circulating reflux, thus avoiding ink contamination and waste; and the enclosed ink delivery reduces the workload in equipment maintenance and cleaning.

Figure 1:
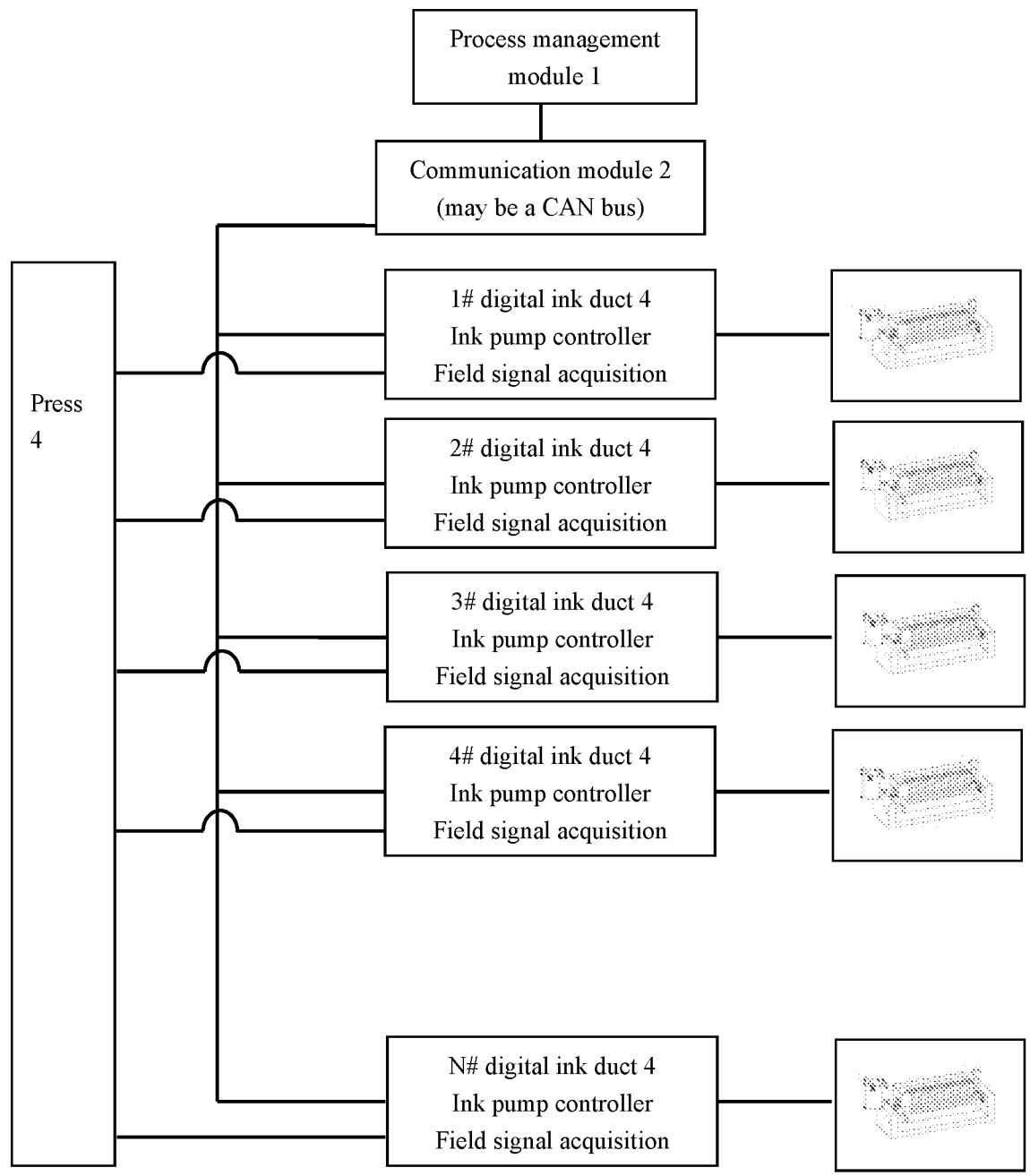
FIG. 1 is a schematic view of an accurate digital ink supply method.

As shown in the figures, process management module 1, communication network 2, printing press 3, digital ink duct 4, ink storage tank 5, pressure valve 6, fast-mounting ball valve 7, main ink pipe 8, housing 9, ink delivery pipe 10, pressure meter 11, mounting bracket 12, ink delivery roller 13, serial ink roller 14, main wall board of the printing press 15, metering-type ink delivery device 16, controller 17, signal acquisition device 18.

DETAILED DESCRIPTION OF THE INVENTION

The present invention is described in further detail with reference to the attached drawings.

The present invention adopts metering-type ink delivery devices to replace the ink keys of the traditional printing press, and the metering-type ink delivery devices directly deliver the ink to the corresponding ink zones on the metering basis of either volume or mass, realizing the quantitative supply of ink to each one of the ink zones.

The medium output quantities and the output capabilities of the metering-type ink delivery devices can be calculated according to their own shapes and sizes of the structures thereof, or the output quantities can be under quantitative control, and the delivery devices include the metering-type plunger pump, injection pump, peristaltic pump, gear pump and screw pump.

One or more of the metering-type ink delivery devices are arranged according to the printing format, and replace the ink ducts of the traditional process, and each one of the metering-type ink devices corresponds to an ink zone to replace an ink key of a traditional printing press.

In the working state, the ink supply flow rate of each one of the metering-type ink delivery devices is independently set and regulated, wherein the ink supply flow rate of each one of the metering-type ink delivery devices is obtained by calculating the ink demand of a corresponding color plate and a corresponding one ink zone in a single printed sheet, and the ink supply flow rate of each one of the metering-type ink delivery devices varies and is calculated and regulated in real time as the running speed of the printing press changes.

The ink demand of each one of the ink zones of each one of the color plates on a single printed sheet is obtained by a calculation method where a dot area of each one of the ink zones of each one of the color plates is multiplied by a required ink layer thickness. The required ink layer thickness is determined according to color requirements and relevant standards. The dot area of each one of the ink zones of each one of the color plates is calculated and obtained according to an image data file for manufacturing the printing plate.

The overall ink delivery operation and control are performed through cooperation between the process management module and the control module. The process management module calculates and obtains the ink demand of a single printing of each one of the ink zones of each one of the color plates according to image data, and transmits the obtained ink demand to the control module; the control module acquires the running state of the printing press through a signal acquisition module; the control module respectively sets an ink flow rate for each one of the metering-type ink delivery devices and makes regulations in real time according to the running speed of the printing press; and during printing, the control module drives all metering-type ink delivery devices to deliver ink to their corresponding ink zones according to their respective set flow rates. The signal acquisition module can acquire the signal, and there may be one or more sensors.

The signal acquisition module is responsible for communicating with the printing press and other external equipment or systems, acquiring the field (real-time) data of the printing press, and transmitting the acquired data to other modules through the communication module.

The ink is delivered in a completely enclosed environment, avoiding or reducing the problems of ink clogging and smudging. The ink is under positive pressure in the enclosed delivery environment.

The control module may be a controller with the functions of: exchanging data with the process management module, exchanging data with the signal acquisition module, automatically controlling the actions of the metering-type ink delivery devices, automatic self-state sensing, collecting various data information and exchanging the collected data information with other modules.

The process management module is a piece of application software disposed in a PC or other terminal devices, can read the image data file after color separation, preform analysis and calculation, and transmit the data to all modules in the digital ink ducts through the communication module.

The following is the implementing process of the method of the present invention:

First, bitmap images of the respective color plates for manufacturing the printing plate are generated through color separation treatment; the manufactured printing plate is installed in the printing press to prepare for printing; the process management module reads the bitmap images of the respective color plates, calculates and obtains the ink demand of each one of the ink zones on a printed sheet, and transmits the obtained ink demand to a controller in a digital ink duct disposed on the printing press for storage through a communication network. The signal acquisition device continuously monitors the field signal and data of the printing press, transmits the signal data via the communication network to the controller in real time. When the printing press performs printing practically, the controller drives the ink delivery devices to supply ink and regulates the output flow rates of the metering-type ink delivery devices in real time according to the printing speed. When the printing press stops printing, the controller stops the ink delivery actions of the ink delivery devices.

Figure 2:
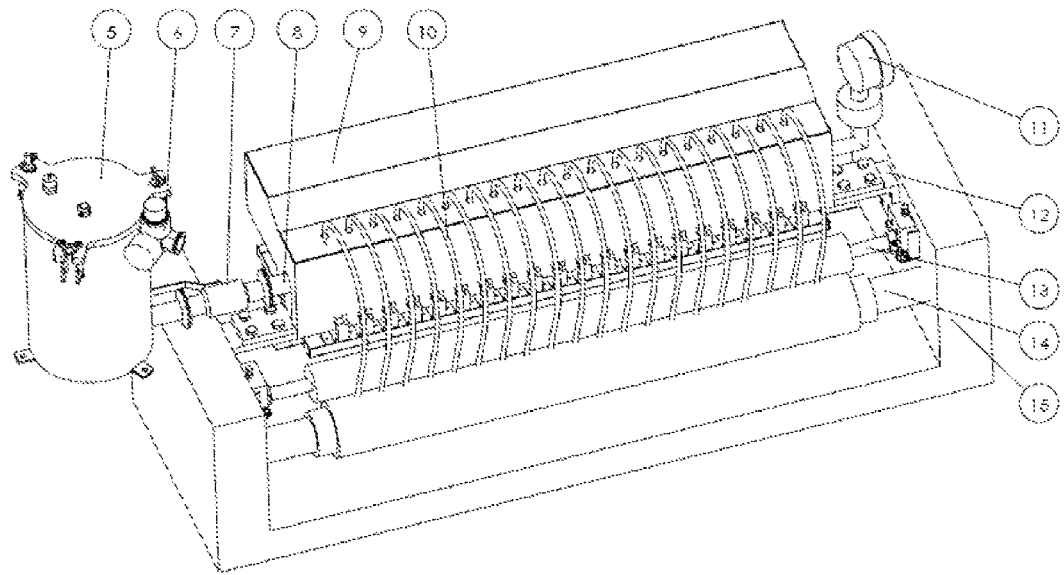
FIG. 2 is a view of entire appearance/installation of a digital ink duct.
Figure 3:
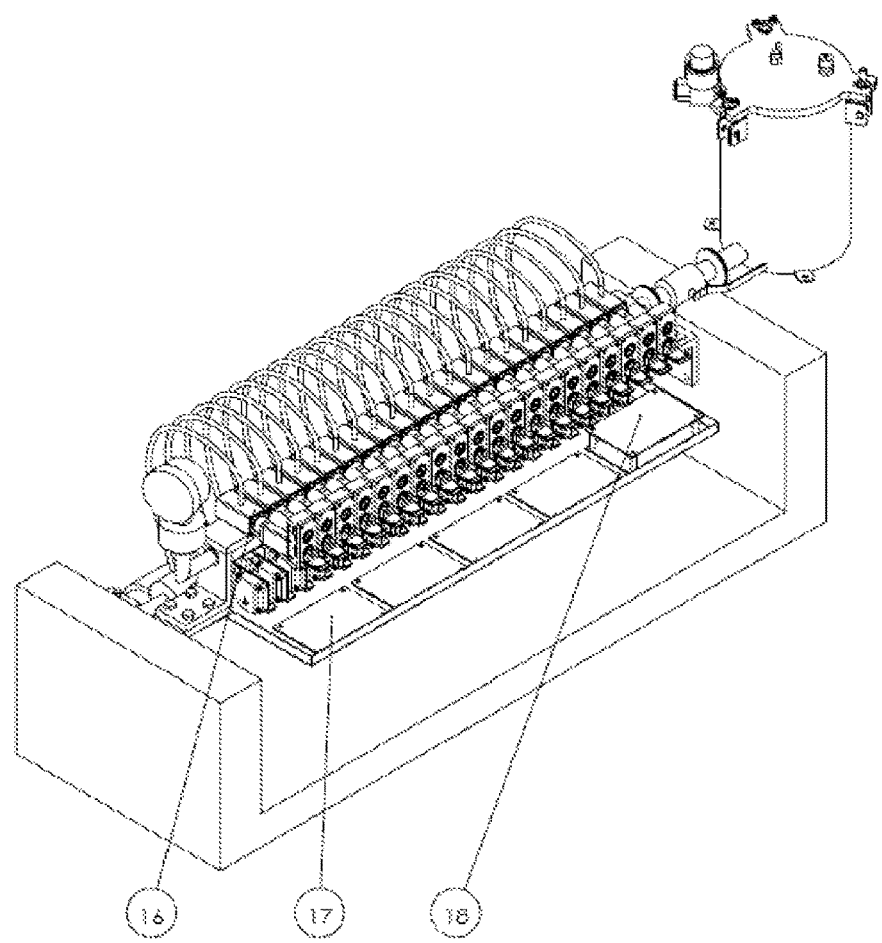
FIG. 3 is a schematic view of an internal structure of the digital ink duct.

Refer to FIG. 1-3, by implementing the method of the present invention in this embodiment, a digital ink supply system for a printing press may be constructed, including a process management module 1, a communication network 2 and a plurality of the digital ink ducts 4.

The digital ink ducts 4 are actuators, respectively installed in the single-color printing units of the printing press 3, and disposed between the main wall boards of the printing press, which means that the digital ink ducts are installed at the ink duct positions of the traditional printing press so as to replace the traditional ink duct device of the printing press.

The process management module 1 is disposed on the PC. The process management module 1 exchanges data with the digital ink ducts 4 and implements control through the communication network 2. The process management module 1 can read image data, calculates and obtains the ink demands of each one of the ink zones of each one of the color plates in a single printing plate according to the image data. The process management module 1 can transmit the data to the digital ink duct 4 through the communication network 2.

The communication network 2 is responsible for connecting the process management module 1 and the digital ink duct 4 so as to transmit data; specifically, the communication network 2 may be a CAN bus.

Each one of the digital ink ducts 4 includes an ink storage tank 5, a fast-mounting ball valve 7, a main ink pipe 8, a housing 9, ink delivery pipes 10, a pressure meter 11, a mounting bracket 12, metering-type ink delivery devices 16, a controller 17 and a signal acquisition device 18.

Each one of the digital ink ducts 4 acquires the running data of the printing press 3 through each corresponding one of the signal acquisition devices 18; the control module 17 respectively sets an ink flow rate for each one of the metering-type ink delivery devices 16 in each one of the digital ink ducts 4 and makes regulations in real time according to the running speed of the printing press; and during practical printing, the control module 17 drives all metering-type ink delivery devices 16 to deliver ink to their corresponding ink zones according to their respective set flow rates. Each one of the ink storage tanks 5 is a pressure vessel for storing ink, is provided with an air pressure valve 6, and is connected with an external pressure air pipe. The output end of each one of the ink storage tanks 5 is connected with one end of each corresponding one of the main ink pipes 8 through each corresponding one of the fast-mounting ball valves 7, while the other end of each corresponding one of the main ink pipes 8 is provided with a pressure meter 11 for monitoring the internal pressure of each corresponding one of the ink delivery pipes; and the ink in each one of the ink storage tanks 5 is boosted by air pressure and then flows into each corresponding one of the main ink pipes 8 through the output end.

Each one of the metering-type ink delivery devices 16 is provided on each corresponding one of the main ink pipes 8, and the ink input end of each one of the metering-type delivery devices 16 is in sealing connection with an ink outlet of each corresponding one of the main ink pipes 8; the output end of each one of the metering-type ink delivery devices 16 is connected with one end of each corresponding one of the ink delivery pipes 10, while the other end of each corresponding one of the ink delivery pipes 10 is disposed between each corresponding one of an ink delivery rollers 13 and each corresponding one of the serial ink rollers 14; a mounting bracket 12 which is connected with the main wall boards of the printing press 15 is disposed at the bottom surfaces of the two ends of each one of the main ink pipes; and each one of the main ink pipes is fixed on the main wall boards of the printing press 15 through each corresponding one of the mounting brackets 12. Each one of the main ink pipes is a run-through pipe with two open ends, and the top surface is a plane formed with a plurality of ink outlets; each one of the ink outlets of each one of the main ink pipes is in a sealing connection with an ink input end of each corresponding one of the metering-type ink delivery devices 16. A housing 9 is disposed outside each one of the main ink pipes and a plurality of corresponding metering-type ink delivery devices 16; each one of the housings 9 is formed with a through-hole for penetration by each corresponding one of the ink delivery pipes; and each one of the metering-type ink delivery devices 16 sucks ink from each corresponding one of the main ink pipes 8 and injects the ink into a corresponding one of the ink zones through each corresponding one of the ink delivery pipes 10.

Each one of the housings 9 is internally provided with a controller 17 and a signal acquisition device 18; each one of the controllers 17 receives the setting and control from the process management module 1 via the communication network 2, stores the running data of each corresponding one of the digital ink ducts 4, receives the data signal from each corresponding one of the signal acquisition devices 18, thus controlling and driving each corresponding one of the metering-type ink delivery devices 16 to quantitatively and continuously output ink.

The signal acquisition devices 18 acquire the field information and data of the printing units, as shown in FIG. 1. FIG. 2 and FIG. 3. Sensors are provided in the printing press 3, specifically for acquiring press-fit signals, ink delivery signals, rotating speeds of the pressing rollers (printing speed), etc., and sending the acquired signals to the controller 17 and the process management module 1.

As shown in FIG. 2 and FIG. 3, each one of the ink storage tanks 5 stores a certain amount of ink, delivers the ink to each one of the metering-type ink delivery devices 16 via the main ink pipe 8, and communicates with the media inlet terminal of each one of the metering-type ink delivery devices 16.

As shown in FIG. 2 and FIG. 3, each one of the metering-type ink delivery devices 16 is selected from any one of the plunger pump, injection pump, peristaltic pump, gear pump and screw pump, with a metering function. Each one of the metering-type ink delivery devices 16 outputs ink by taking volume or mass as the metering basis. The metering-type ink delivery devices 16 deliver ink in a designed way or stop ink delivery under the command of the controller 17; the metering-type ink delivery devices 16 are arrayed along the printing format; each one of the metering-type ink delivery devices 16 corresponds to an ink zone, and the output ink is directly delivered into the corresponding ink zone.

When the digital ink ducts 4 deliver ink, the ink delivery environment is relatively enclosed, which means that the ink is isolated from air in the process of flowing from each one of the ink storage tanks 5 to the ink outlets of each corresponding one of the ink delivery pipes 10 via each corresponding one of the fast-mounting ball valves 7, main ink pipes 8 and metering-type ink delivery devices 16, and the whole delivery pipeline is in a positive pressure state inside.

During the printing process, the bitmap images of respective color plates generated through RIP color separation treatment are used to manufacture the printing plates, and the printing plates are installed in the printing press 3. At the same time, the process management module 1 reads in the bitmap images, calculates and obtains the ink demands of each one of the ink zones a printed sheet, and transmits the obtained result via a communication network 2 to the controller 17 for storage. The signal acquisition devices 18 continuously monitor the field signal and data of the printing press 3, transmit the signal data via the communication network 2 to the process management module 1 and the controller 17 in real time. When the printing press 3 performs printing practically, the controller 17 drives the metering-type ink delivery devices 16 to supply ink and regulates the flow rates of the metering-type ink delivery devices 16 in real time according to the printing speed. When the printing press 3 stops printing, the controller 17 stops the ink delivery actions of the metering-type ink delivery devices 16.

The invention claimed is:

1. A digital ink supply method for a printing press, comprising the steps of:

calculating an ink demand according to a color plate, and a metering-type ink delivery device outputting ink demanded for printing to a corresponding ink zone to realize quantitative supply of the ink to each one of ink zones; wherein the calculation of the ink demand is based on either volume or mass;

wherein in the working state, the ink supply flow rate of each one of the metering-type ink delivery devices is independently set and regulated, wherein the ink supply flow rate of each one of the metering-type ink delivery devices is obtained by calculating the ink demand of a corresponding color plate and ink zone in a single printed sheet and the running speed of the printing press, and the ink supply flow rate of each one of the metering-type ink delivery devices is calculated and regulated in real time as the running speed of the printing press changes;

wherein the ink demand of each one of the ink zones of each one of the color plates in a single printed sheet is obtained by a calculation method where a dot area of each one of the ink zones of each one of the color plates is multiplied with a required ink layer thickness; wherein the required ink layer thickness is determined according to the color requirements and relevant standards; and the dot area of each ink zone of each one of the color plates is calculated and obtained according to an image data file for manufacturing a printing plate; and wherein during the entire process of ink delivery operation and control, ink supply is realized and controlled by a process management module and a control module; wherein the process management module calculates and obtains the ink demand of each one of the ink zones in a single printed sheet according to image data, and transmits the obtained ink demand to the control module; wherein the control module acquires the running state of the printing press according to a signal acquisition module; wherein the control module respectively sets an ink flow rate for each one of the metering-type ink delivery devices and makes regulations in real time according to the running speed of the printing press; and during printing, the control module drives all metering-type ink delivery devices to deliver ink to their corresponding ink zones according to their respectively set flow rates.

2. The digital ink supply method for a printing press according to claim 1, wherein the metering-type ink delivery devices control the output flow rate of the ink by controlling the running speeds of moving parts.

3. The digital ink supply method for a printing press according to claim 2, wherein each one of the metering-type ink delivery devices is selected from any one of the following types, plunger pump, injection pump, peristaltic pump, gear pump and screw pump, with a metering function.

4. The digital ink supply method for a printing press according to claim 3, wherein each one of the metering-type ink delivery devices is a plunger pump or an injection pump; wherein each one of the metering-type ink delivery devices controls the running speed of a piston to control the output flow of the ink, and calculates the ink output according to the cross-sectional area of a piston cavity and a moving distance of the piston.

5. The digital ink supply method for a printing press according to claim 1, wherein the ink is delivered in a completely enclosed environment.

6. The digital ink supply method for a printing press according to claim 5, wherein the ink is under positive printing pressure condition within the enclosed ink delivery environment.

* * * * *